Patented Mar. 25, 1952

2,590,258

UNITED STATES PATENT OFFICE 2,590,258

DENTAL PROTHESIS

Emil Märki, Basel, Switzerland

No Drawing. Application January 10, 1949, Serial No. 70,151. In Switzerland June 17, 1948

4 Claims. (Cl. 32—2)

This invention relates to an improved dental prothesis and to a process for the manufacture thereof.

At present dental protheses are generally prepared from synthetic resin. This material is specifically lighter than the caoutchouc which was previously employed. The difference in specific weight is often undesirable for protheses for the lower jaw in that the prothesis is readily lifted from its seat. In order to overcome this disadvantage protheses for the lower jaw have already been made artificially heavy, for example by applying a base plate of tin or by inserting specifically heavier material into the cavities in the prothesis. These measures have an unaesthetic effect and are associated with additional labour and costs.

It is an object of the present invention to overcome this disadvantage in a simple manner. The invention is based on the recognition that a polymerisable synthetic resin mixture, such as is usual for the production of protheses, can be mixed and polymerised with a preferably finely powdered metal, with simultaneous union with a layer of a purely pulverisable synthetic resin mixture.

According to the invention there is provided a dental prothesis wherein the teeth are embedded in a coherent mass, at least the front face of which consists of synthetic resin whilst the remaining part consists of a polymerised mixture of metal and synthetic resin, the mixture containing for example tin and/or silver amalgam and/or other metals.

The invention also provides a process for the production of the above described dental prothesis, wherein a polymerisable synthetic resin mixture is first introduced into a mould containing the teeth, so that the said mixture forms the front face at least of the prothesis, whereupon the polymerisable mixture of synthetic resin and metal containing for example tin and/or silver amalgam and/or other metals, is introduced into the mould, and the contents of the mould, when filling has been completed, are consolidated by heat and pressure.

The above-described process can be carried out in principle in exactly the same manner as has hitherto been customary for the production of dental protheses, by mixing a suitable pulverulent polymer with a suitable liquid monomer and introducing a synthetic resin mixture in the desired manner into the mould. Hereby regard must be had to the desired placing of this synthetic resin mixture, so that all those parts of the prothesis which are visible from in front when the prothesis is worn and the mouth is open, are formed as far as possible exclusively from this synthetic resin mixture. One may proceed by suitable kneading together of the mixture in a doughy consistency into a roll and by bedding this roll at the desired place into the mould provided for the teeth.

Thereafter, for example, the same synthetic resin mixture is mixed with a suitable metal powder. This mixture can likewise be formed into a roll by sufficient kneading and the remaining part of the mould can be filled therewith. A residual amount of the mould can also be left unfilled and this can then be filled with a polymerisable synthetic resin mixture if it is considered of special importance that the surface of the inner side of the prothesis also should be formed by synthetic resin.

The subsequent polymerisation of the whole takes place under pressure and heat in the mould in the usual manner. As extensive experiments have shown, the synthetic resin mixture unites completely with the mixture of synthetic resin and metal and the whole is completely consolidated. A prothesis produced in this way can be made of any specific weight coming into question in practice by choice of the kind and quantity of metal. In so far as the surface of the dental prothesis is formed of the metal mixture, it can be made completely smooth and polished by suitable means.

The metal mixture may for example contain tin, and/or silver amalgam and/or similar metals. In order that it shall be polymerisable, the proportion of polymerisable synthetic resin mixture must reach a certain threshhold value which in most cases should not lie below 20% by weight. Good results are obtained with 20% to 30% by weight of a polymerisable synthetic resin mixture and 50% to 70% by weight of tin and silver amalgam. A preferred composition comprises 5 parts of polymerisable synthetic resin mixture, 10 parts of tin and 2 parts of silver amalgam.

Having now particularly described and ascertained the nature of my said invention and in what manner the same is to be performed, I declare that what I claim is:

1. In a dental prothesis including artificial teeth, the teeth being embedded in a coherent mass, at least the front face of said mass consisting of synthetic resin, the remaining part of said mass consisting of a material including a polymerized synthetic resin-metal mass, at least a part of said metal consisting of tin-mercury alloy.

2. In a dental prothesis including artificial teeth, the teeth being embedded in a coherent mass, at least the front face of said mass consisting of synthetic resin, the remaining part of said mass conisting of a material including a polymerized synthetc resin-metal mass, at least a part of said metal consisting of silver-mercury alloy.

3. In a dental prothesis including artificial teeth, the teeth being embedded in a coherent mass, at least the front face of said mass consisting of synthetic resin, the remaining part of said mass consisting of a material including a polymerized synthetic resin-metal mass, the mixture containing 20 to 30% by weight of a metal amalgam selected from the group consisting of tin and silver.

4. In a dental prothesis including artificial teeth, the teeth being embedded in a coherent mass, at least the front face of said mass consisting of synthetic resin, the remaining part of said mass consisting of a material including a polymerized synthetic resin-metal mass, said mixture containing five parts by weight of synthetic resin mixture and approximately 10 parts by weight of tin amalgam and two parts by weight of silver amalgam.

EMIL MÄRKI.

REFERENCES CITED

The following references are of record in the file of this patent:

UNITED STATES PATENTS

| Number | Name | Date |
|---|---|---|
| 2,230,164 | Myerson | Jan. 28, 1941 |
| 2,279,067 | Shapiro | Apr. 7, 1942 |
| 2,346,624 | Straus | Apr. 11, 1944 |